Patented Sept. 15, 1931

1,822,995

UNITED STATES PATENT OFFICE

RALPH F. MEYER, OF FREEPORT, PENNSYLVANIA, ASSIGNOR TO MEYER MINERAL SEPARATION COMPANY, OF PITTSBURGH, PENNSYLVANIA, A CORPORATION OF DELAWARE

METALLURGICAL PROCESS

No Drawing.  Application filed October 8, 1930. Serial No. 487,363.

This invention relates to the treatment of ores and other metalliferous materials for the recovery of their metal values, especially by combined hydro-metallurgical and pyro-metallurgical processes.

A major object of this invention is to provide a metallurgical process that improves extraction yields, is adaptable to a wide range of materials, extends the economical treatment of ores to artificial, natural or modified low grade or refractory metal-bearing materials, and is applicable to the ready solubilizing of metal values in general, whatever their state or condition or complexity.

A particular object is to provide a chloridizing process of the foregoing type which is applicable to ready and economical solubilizing of metal values, and particluarly to the treatment of ores of an oxide type, including for example oxides, sulfates, silicates and carbonates.

The invention is predicated upon my discovery of particularly effective conditions for the introduction of reagent gases into ores so as to convert their metal values into forms that are readily amenable to simple recovery. More particularly, it is based upon my discovery that especially efficacious and far-reaching solubilizing of metal values may be effected by a gaseous reagent, if the material undergoing treatment contains a reagent metal in a lower condition of valence, and if moisture is present in the material to a degree and for a time hereinafter to be described more fully.

I have discovered further that if the material, containing reagent metal and moisture as just referred to, is treated with gaseous reagent at or near normal temperature, followed by elevation of the temperature to above about 100° C., especially valuable solubilizing action occurs, and that this is enhanced as the temperature is raised to about 200° to 400° C. in the presence of oxygen.

In accordance with the invention the solubilizing of any refractory metal values which remain unattacked may then be completed by means of nascent chlorine, or other suitable halogen, at a temperature upwards of 400° C.

The preferred embodiment of the invention contemplates a continuous treatment in the manner outlined, combined with countercurrent re-cycling of substantially constant amounts of the reagent gases.

As used herein the term "reagent metal" has reference to a metal capable of existing in its compounds in higher and lower valences, or in "-ic" and "ous" conditions, for example copper, iron, and manganese. For most purposes iron is the preferred reagent metal, and since according to the invention the reagent metal is used in a lower valence stage ferrous iron will be referred to herein as illustrative, but not restrictive of the invention. Magnetic iron oxide (ferroso-ferric oxide) is likewise herein considered ferrous iron oxide because it acts in a similar manner.

The benefits of the invention are in part dependent upon my discovery of the advantages which attend the use of reagent metal in a lower condition of valence, which for convenience may be termed the -ous condition. I have discovered that -ous reagent metal oxides combined with reagent gases much more readily than such oxides in the -ic condition. Thus, in the presence of water ferric oxide and chlorine will not combine to any appreciable extent to form iron chlorides. On the other hand, ferrous oxide (or magnetic iron oxide) in the presence of water combines readily with chlorine to form reagent ferrous chloride. Also, ferric oxide does not combine nearly as readily with hydrochloric, sulfuric or sulfurous acid in the presence of moisture, as ferrous oxide.

Further benefits of my discovery of the advantages of reagent metal oxides in the -ous condition arise from the behavior of their compounds. For example, -ic reagent metal compounds break down more readily and at lower temperature than the -ous compounds, and the dissipation of such -ic compound in this manner therefore reduces its efficiency as a reagent for attacking metal values. For instance, ferric chloride breaks down readily to ferric oxide and hydrochloric acid at about 100° C. But ferrous chloride is broken down slowly and progressively from about 250° C. to 500° C. in the presence of oxygen.

For these reasons ferric oxide and ferric chloride are but indifferent reagents in solubilizing metal values. In contrast therewith the ability of ferrous oxide to fix chlorine readily, and the slow progress in decomposition of ferrous chloride makes it a particularly effective and efficient reagent compound, especially at temperatures from 250° to 500° C. The same factors are true also of ferric and ferrous sulfates.

It is therefore characteristic of the processes of this invention that an excess of reagent metal oxide in the -ous condition is present until the period of formation of the -ous reagent compounds has been passed. Thereafter those compounds are thermally decomposed to -ic oxides and reagent gases which attack the metal values, for example by chloridizing them.

Many ores contain iron in amounts sufficient for the purposes of the invention, which may be converted to the ferrous condition. The benefits of the invention, however, may be realized fully by adding ferrous iron to the material to be treated to supply either part or all of the reagent metal. As will appear more fully hereinafter, this may be done by providing ferrous oxide or magnetic iron oxide in the ore, or by adding ferrous chloride, or in other ways.

The gaseous reagents contemplated are those capable of acting upon reagent metals to form compounds which may be decomposed thermally to provide reagent gases which readily react with the metal values to form soluble compounds thereof. Such gases are, for example, sulfur dioxide, chlorine, and hydrochloric acid gas. With some ores the use of chlorine alone suffices in the preliminary stages of treatment, i. e., in treating the ore moistened as referred to. In some instances, as with oxidized precious metal ores, satisfactory results may be had frequently by treating the moist ore with sulfur dioxide and chlorine. In such cases the content of reagent metal may be reduced to minimal amounts.

Further features of the invention and of the principles of its application to particular types of ore, or in combination with other processes, will appear from the following detailed description and examples presented as typifying the invention.

Heretofore the chloridization of oxidized ores has been considered extremely difficult and has been economically impossible. The processes provided by this invention are particularly adapted to economical treatment of such oxidized ores, and for these reasons their treatment has been selected to exemplify it. Further, as some sulfide ores are particularly refractory, this example may be extended to include with these oxides some portion of such refractory sulfide. Such material normally would result, for example, from roasting almost any nickel sulfide ore, and normally some amount of iron would be present. For illustration the iron may be considered to be present partly as sulfide and partly as oxide, with or without some proportion existing as sulfate. As is known in the art, this would result normally with any sulfide ore roasted to something less than a dead roast.

In accordance with the invention, a charge of ore containing ferrous oxide is fed into a suitable furnace and roasted by subjecting it to progressively increasing temperature while in the presence of oxygen and reagent gas. As mentioned previously, the ore adjacent the inlet end of the furnace contains preferably a restricted amount of moisture which provides especially effective attack. Ore thus moistened may be termed, for brevity of reference, in a quasi-wet condition.

As used herein, the term quasi-wet means that free liquid is absent from the interstices of the ore, and that the individual particles are wetted with a moisture film that is very minute. There is no flow of liquid through the ore. Such ore is scarcely moist to the touch. It is of loose, open structure, requiring considerable hand pressure to compact it, and then crumbling readily again. A portion of ore in this condition occupies more volume than before being thus wetted. There is a maximum moisture content, varying with different ores, above which the ore volume diminishes rapidly and the particles agglomerate as the voids between them begin to be occupied materially with liquid. This volume change affords a ready practical test of the quasi-wet condition.

The roasting apparatus preferably is a rotary drum furnace, although a multiple hearth furnace may be used. The chief criteria are ability to agitate the charge evenly, and to provide zones of appropriate temperature.

In the preferred practice of the invention the flow of gases in the furnace is countercurrent to the movement of the ore charge, and incoming ore passes first into a zone adjacent the inlet maintained at such a temperature that moisture will be condensed upon the ore from steam carried by the furnace gases. The ore first charged to the furnace in initiating a roast in accordance with this practice will carry moisture; preferably it is quasi-wet. As soon as operating conditions have been established there will usually be sufficient moisture in the furnace for the purposes of the invention, and the ore subsequently charged need not be wet, but may be fed dry, or substantially dry. Such dry ore will then be rendered quasi-wet in the zone adjacent the inlet by condensation of steam driven off from the ore at a later stage. A small amount of moisture may be introduced with the ore, however, to replace the moisture lost during operation and also to prevent the dusting of a finely ground ore. One to two percent of moisture in the ore is usually sufficient.

This quasi-wetting puts the ore into a condition favorable to reception and fixation of gaseous reagent carried in the counterflow of gases. Thus, the reagent metal compound, such as ferrous oxide, will be attacked by chlorine and hydrochloric acid liberated in the hotter, subsequent zones, with formation of ferrous chloride.

From the ore inlet zone the quasi-wet ore, modified by the action of the reagent gas, passes into a zone of progressively increased temperature. Here moisture is driven off as steam from the ore and returned by the countercurrent gas flow to the incoming ore. The increased temperature also causes decomposition of the ferrous chloride, and the decomposition may begin as low as 80° C. with properly moist ore and in the presence of oxygen. The decomposition progresses gradually up to above 400° C. Actual practice has shown that up to about 250° C. there is still sufficient moisture present in the ore to form some hydrochloric acid. In general the temperature of this zone lies between the approximate values stated.

The chlorine and hydrogen chloride thus liberated attack the metal values to form chlorides. Ferric chloride and similar compounds in their highest valence condition are much less efficient for this purpose. On the other hand, and it is upon this that my invention is in part predicated, much greater efficiency results from the use of reagent metal compound in a lower valence condition. This is due in part to decreased volatility and the ability to prolong the decomposition, whereby the rate of chlorine release is such that most of it is capable of attacking the metal values.

In fact, the chloridizing action thus obtained is so profound that as the ore leaves this zone the major portion of the metal values in most materials will have been chloridized. In order to complete the chloridizing, if necessary, the ore then passes into a zone of maximum heat, for example to 450° to 500° C., or even to 550° C. Here decomposition of a halide, such as common salt, is effected, whereby the combined action of nascent halogen and high temperature completes attack of even the most refractory compounds. Such halide decomposition also provides chlorine to make up for that used in forming the metal value chlorides, and thereby sufficient chlorine is provided for continuous operation.

The halide used in this zone may be admixed with the ore fed to the furnace, or it may be added at this point. Its decomposition may be effected by means of gaseous oxides of sulfur passed into the furnace, in accordance with the counterflow principle referred to. However, sulfates present in the ore, such as those produced by preliminary roasting of sulfide ores, are applicable for this purpose. Such materials are herein termed sulfate constituents, since their action upon halides to liberate free halogen is the same whether they are gaseous, for example sulfur dioxide, or solids, such as sulfates. When using gases from sulfur burners or from roasting operations, the gas introduced preferably contains from about 1 to 3 per cent of sulfur dioxide when the metal values are to be obtained as chlorides.

Usually it is desirable to lower the temperature of the product before discharging it into the atmosphere, in order to retain the metal value chlorides as such. This may be done by providing an unheated, or cooling, zone adjacent the ore outlet, and by passing the oxygen-containing atmosphere over the ore in this region. In most instances the ore may be discharged to the atmosphere at some temperature below about 300° C.

Thus it will be seen that ore passes into successive zones of temperature progressively increasing to a maximum, in one of which decomposition of reagent metal compound results in extensive chloridizing of the metal values. Also, reagent gas and moisture are continuously recirculated in the furnace.

In the preferred countercurrent chloridizing of oxidized ores the gases flow from regions of high temperature to the zone of moisture condensation. This flow combined with the elevation of temperature effects a constant recycling of the water, and of halogen liberated in the heated reaction zones.

Where moisture is present, hydrochloric acid is formed in some proportion, but this is comprehended in this specification under the term chlorine. The chlorine consumed in the formation of metal value chlorides is replaced most simply by the decomposition of the sodium chloride added to the charge. The presence of ferrous iron, ordinarily as ferrous oxide or magnetic iron oxide, insures the absorption of chlorine largely in the cool zone adjacent the inlet. Also, in the presence of oxygen the ferrous chloride enters into the chloride reactions.

Control is simple, for preferably sodium chloride is added to the charge in amounts approximately chemically equivalent to the values to be chloridized, and thus builds up an approximately constant chlorine atmosphere. The presence in the charge of ferrous oxide in at least a corresponding amount maintains an excess of the ferrous iron, which is desirable. The provision of greater proportions of sodium chloride and of ferrous oxide is largely a question of economy, but is within the bounds of this invention.

Oxygen is consumed to some extent in the furnace, and its concentration in the furnace is regulated preferably so that some small amount of water-soluble iron remains in the discharging ore. This affords a measure indicative of the presence of a proper amount of oxygen in the zone of ferrous chloride decomposition, and it tends to reduce oxidation of metal value chlorides. The air thus provided therefore cools the outgoing product and returns heat units to the system, and also assists the various reactions in the furnace, and is effective in repressing volatilization of chlorides. Those skilled in this art will understand the variations of control thus afforded and the effects of the countercurrent flow of gases in contact with the ore.

Considerable variation of both the chemical and mechanical conditions is possible. Chloridizing, for example, preferably is applied to oxidized ores, but sulfide ores may be present in some proportion, even to constituting the entire charge. However, in chloridizing it is preferable to subject sulfide ores to preliminary oxidizing treatment. Also, in contrast to the preferred practice just described, the charge, provided with ferrous iron, may be brought to a quasi-wet condition and then, in a stationary or concurrent atmosphere of chlorine and restricted oxygen content, may be heated through the range of temperature outlined. Furthermore, some ores do not require the high temperature stage of sodium chloride decomposition. Also, the absorption of the chloride gases and moisture by the ore, may be effected in a separate apparatus, the thus-treated ore being then introduced into the heated chloridizing roasting furnace and the resulting gases again absorbed in such separate unit.

In the practice of this invention a considerable range of ore particle size is permissible, even with a given ore. With some ores, for example copper-gold ores, crushing to about standard 40-mesh is sufficient, or even approximately 10-mesh is permissible, and the fines may accompany the main body of ore. In other cases very fine grinding is of exceptional advantage, and here the ore is preferably reduced to substantially minus standard 140-mesh, and it may be minus 200-mesh or finer. Such grinding not only opens up refractory or precious metal material, but further affords more effective control of the process.

It is of advantage also to impose pressure on the gases in contact with the ore. This is accomplished readily. With a rotary drum furnace, for example, simply by restricting or entirely closing the openings and permitting pressure to build up from the gases liberated in reaction or preferably by also injecting air under pressure. A pressure of approximately 1 to 50 pounds above atmospheric is a preferred range. Periodic or intermittent increase and decrease of pressure is effective. The use of pressure facilitates the fixation of chlorine by the quasi-wet ore containing ferrous iron in the cool inlet zone, and it prolongs the decomposition of the halide reagents. Furthermore, it assists the attack of refractory compounds by chlorine in the higher temperature zone where sodium chloride and sulfate constituents are reacting. The use of pressure in chloridizing is advantageous particularly where the preliminary treatment has resulted in a poor roast or in a fritted condition of the ore particles.

The ore emerges containing the metal valuses chiefly as chlorides, and substantially all of the iron as oxide. Very high conversions are obtainable. The iron, designedly, is obtained as oxide, for this particularly fits the ore for simple leaching, since iron oxide is insoluble in water or dilute acid. The presence of excessive amounts of oxygen in contact with the ore as it passes from the zone of maximum heat is undesirable, because it tends to cause decomposition of metal value chlorides. In further amplification of the invention, I have discovered that a small percentage of water-soluble iron, say one-half or three-quarters of one percent, serves to guard against this undesirable breaking down of chlorides. Usually a ready test of the amount or the condition of the oxygen is to admit it until a test of the product shows the soluble iron in the discharging ore to be in sufficient proportion, say until the water-soluble iron is below one percent.

The heat of reaction may be, and preferably is, augmented by heat otherwise presented. This may be effected by the introduction of gases from the extraneous combustion of carbonaceous material. In some instances, it is preferred to heat indirectly. For example, a portion of the furnace may be jacketed and steam, or hot roaster or other furnace gases passed therethrough. The heating gas preferably is applied to the zone of maximum temperature of the charge, while cooling is effected nearer the ore discharge.

It is within the scope of the invention to dispense with the introduction of salt or an equivalent halide salt either entirely or in part, by providing ferrous chloride. Or, fresh ore containing ferrous iron may be moistened with liquid, and at that point there may be present with the liquid suitable amounts of chlorine to maintain the process.

Instead of being applied primarily to recover the metal values in readily soluble form, the invention may be applied to the obtaining of gangue for some particular purpose. For example, low grade iron ores may be chloridized to render the impurities soluble, and after leaching there results a pulverulent purified iron ore, or gangue, ready for usual iron ore treatment. In such a case the major aspect is the beneficiation of low grade iron ore. In some instances values may be recovered in volatile form. For example, it is possible to volatilize silver at the ore discharge end of the furnace or to modify the procedure to obtain arsenic in the gas leaving the ore inlet end. Any volatilization at the ore discharge end is assisted by decreasing the air current or with chloride and sulfate constituent present increasing the final temperature. Usually, however, it is preferred to reduce volatilization to a minimum.

Where the metal values are particularly high, as with some concentrates, it is advisable in some instances to dilute the charge with lower grade material; but materials containing up to about 10% of values usually will require no dilution. The chief purpose and measure of such dilution is to prevent agglomeration from excessive amounts of chlorides formed.

The time of operation will vary according to the material being treated. A roast of about four hours at a uniform rate of ore movement in the furnace has proved to be an adequate average time. This becomes a matter well within the judgment of an operator.

The treatment of a charge prior to the chloridizing roast varies with the circumstances and may or may not be preceded by the extraction of metal values. For example, an oxidized ore often requires only grinding to fit it for chloridizing in accordance with the invention. Materials containing soluble matter, such as copper sulfate, preferably are leached before the chloride roasting. Also, since iron is particularly effective as the reagent metal and is present generally in ore, ferrous iron may be formed in situ by subjecting the ore to a preliminary reducing treatment. In tests of the invention this has been done, simply by treating the ore, for example nickel-silicate ore, with producer or natural gas or with sulfur dioxide low in oxygen, for ten to thirty minutes at about 500° C. Or, a portion of a charge may be so treated to obtain ferrous oxide and then added as desired to subsequent charges, either to provide ferrous iron, or as a diluent containing it. The same result may be had by heating ore mixed with carbonaceous material, for example coal. It is not the purpose of such reduction to obtain the elemental metal, though if some metallic particles are formed they become active in the process as salts of metals in lower condition of valence.

Sulfide ores preferably are given a preliminary oxidizing treatment. Such treatments are within present skill in the art, but preferably the roasts are so conducted as finally to leave appropriate amounts of ferrous iron. This may be accomplished by considerably restricting the admission of air in the later stages of the roast. In addition to ferrous iron oxides the product usually will contain ferric oxides and sulfates, and usually some small amounts of sulfides. Suitably such roasts may be conducted in a rotary drum or multiple hearth furnace with the temperature raised uniformly and gradually to about 500° C., preferably with a restriction of the air passing into the hot ore, which serves both to keep down the temperature and to assure the presence of lower valent reagent metal.

In many instances preliminary roasts may be regulated to obtain sulfates of some of the metal values. Such a preliminary roast will be particularly effective with refractory ores if before its completion the ore is quasi-wet and then re-roasted. The sulfates formed may be leached out, and the residue returned for the chloridizing roast.

Often it is especially effective to provide sulfur dioxide in contact with the quasi-wet ore, and, in many cases, to provide also halogen gas, such as chlorine. Such latter treatment is particularly effective to release precious metals from a surrounding oxide film, but it is suitable also to release other values than precious metals.

With quasi-wetting, it is desirable for this preliminary treatment of sulfide ores to grind to about 200-mesh, especially in the case of dense ores, such as those of zinc or manganese, or with highly refractory ores, such as those containing titanium or nickel sulfide. The ore is first roasted in the conventional way to remove sulfur, and this roasted material is then treated in a subsequent roast with the roaster gases or sulfur dioxide. The subsequent roast may be effected by countercurrent gas flow, preferably combined with quasi-wetting, in the manner described for the chloridizing roast. Here again the use of pressure is desirable. For example, suitable sulfating occurs in an atmosphere of sulfur dioxide and air between 100° and 475° C. in a very few minutes with such ore containing ferrous oxide by intermittently applying air pressure of from 1 to 50 pounds above atmospheric, the period of pressure totalling about one-tenth to one-twentieth of the total time.

Particularly effective sulfate roasting of these ores is obtainable by alternating the character of the atmosphere in contact with the ore being sulfated while maintaining the temperature below that of sulfate decomposition. An especially suitable procedure is that disclosed and claimed in my U. S. Patent No. 1,730,584, according to which the ore is subjected alternately to an atmosphere of sulfur dioxide and oxygen, and then to an atmosphere containing oxygen but substantially free from oxides of sulfur.

An effective treatment preliminary to chloridizing that is of importance with sulfide ores is to roast the ore, whether dead roast or not, to eliminate sulfide, then to quasi-wet the ore with water and sulfur dioxide, and then subject the thus-treated ore to a sulfating roast such as described above. In this treatment the imposition of pressure as described above greatly aids in the introduction of sulfur dioxide into the ore, and it enables the use of lower temperatures and provides more ready control of the ferrous iron content, thus especially fitting the ore for chloridizing as herein described.

Just as in chloridizing the preferred practice in sulfating is to have present from the beginning of the roast a reagent metal oxide in the "ous" condition, and here again ferrous iron may be present normally, or it may be added. The preferred procedure at this preliminary stage is similar to that above described for the chloridizing roast.

The ore temperature progressively is raised to about 450° or 550° C. and heat is applied as described for the chloridizing. Regulation of oxygen contacting with the ore, and of pressure if resort is had to this feature, may be according to the procedures outlined heretofore, preferably by restricting the oxygen to obtain sufficient ferrous iron or other lower valent reagent metal compound for the subsequent chloridizing. In the case of some ores which are to undergo an intermediate leaching it may be preferable to oxidize the iron completely at the end of the sulfating stage, the ferrous iron necessary for subsequent chloridizing being then provided in some suitable way as described hereinbefore.

Frequently it is useful to resort to a sulfating roast where sulfide ores have been over-roasted or poorly roasted, as well as to permit the leaching out of some of the values previous to the chloridizing, such as copper sulfate, zinc sulfate, for example.

It will serve to illustrate the practice of this invention under different conditions to refer to examples taken from actual practice. In the following examples, ferrous oxide was provided as previously described herein, as by restricting air in the final stages of sulfide roasting, or by treating oxidized material with reducing gas.

*Example 1.*—A sulfide ore containing about 20 per cent of copper, 12 per cent of antimony, and 53 ounces of silver per ton, together with iron and other usual impurities, was ground to 200-mesh, roasted 3½ hours below 475° C., rendered quasi-wet with water to hydrate the salts which had formed in roasting, and roasting then completed with similar temperature control. The roasted ore was then again ground to approximately 200-mesh, after which it was placed in cold 4 per cent $H_2SO_4$ solution and agitated with air for 6 hours, followed by thorough washing with water to remove the bulk of the copper. The residue then contained 1½ per cent copper, all of the silver and antimony, and about 2 per cent of sulfide sulfur, together with ferrous oxide.

The ore was then dried until its water content was just sufficient to render it quasi-wet, when it was mixed with 3 per cent by weight of sodium chloride and treated with chlorine, followed by gradual heating in a muffle for 4 hours at 100° to 450° C., during which time considerable steam and hydrogen chloride were evolved, together with some chlorine. The ore was turned over regularly, air being continuously admitted in regulated amount. At the end of this time the diminished evolution of fume showed that the decomposition of ferrous and sodium chlorides was practically complete. When cool the ore was leached with hot water, thus obtaining a total extraction of more than 99 per cent of the copper, and practically all of the silver was soluble in ammonia. Part of the antimony was soluble in dilute caustic soda solution.

*Example 2.*—An exceptionally refractory copper-nickel-cobalt ore containing iron, sulfur, silica, etc., which, although desirable because of its metal value relations and its occurrence in exceedingly large deposits, has been rejected hitherto as being incapable of extraction by previously known methods, other than smelting, was ground to 200-mesh, roasted 3½ hours below 475° C., again ground to 200-mesh, and rendered quasi-wet with a 2 per cent solution of sodium chloride. To the quasi-wet material there was added one per cent by weight of sodium chloride, and it was then exposed to chlorine. No sulfur dioxide was needed, because sulfates were formed in roasting. The material, contained in a muffle, was heated gradually 2 hours to about 300° C., followed by 2 hours gradually increased heating to about 475° C., and it was turned over frequently with restricted admission of air. After cooling, the material was leached with water, and practically all of the metal values were recovered in this way, as shown by the following tabulation:

| Metal | Original ore | In leached residue |
|---|---|---|
| | Per cent | Per cent |
| Nickel | 4.5 | 0.16 |
| Cobalt | 0.33 | 0.13 |
| Copper | 0.26 | 0.0 |

*Example 3.*—An ore containing from 40 to 45 per cent of iron, about 30 per cent of sulfur, 3.02 per cent of copper, 1.17 per cent of cobalt, and 0.5 per cent of arsenic, together with some phosphorus, was ground to 200- mesh and roasted 3½ hours below about 475° C. The roasted ore was ground to approximately 200-mesh and leached cold, first with 4 per cent sulfuric acid and then with water, until the sulfates were completely washed out. The ore was then dried until it contained about 15 per cent of water, which rendered it properly quasi-wet, after which with ferrous iron present it was treated with chlorine. The ore was stirred during passage of the chlorine into it, and owing to the evolution of a large amount of heat, it was necessary to restrict the rate of chlorine addition.

The ore was next heat treated in a muffle in a continuous regulated stream of air for four hours, the temperature being gradually increased from 100° C. to 450° C. At the end of this time the marked diminution of the chlorine-hydrogen chloride evolution indicated that the ferrous chloride was practically completely broken down. After cooling, the ore was leached with water, and analysis showed that 98.1 per cent of the copper and 96 per cent of the cobalt were soluble, while sulfur, phosphorus and arsenic were practically eliminated. The residue after leaching was suitable for iron manufacture.

The sulfuric acid leaching prior to chloridizing was performed merely to prove that chlorine alone was effective to purify this iron ore and that the presence of sulfates was unnecessary under these circumstances.

*Example 4.*—Another ore containing 25 to 30 per cent of sulfur, about 40 per cent of iron, 3.64 per cent of nickel, 0.26 per cent of copper, and .33 per cent of cobalt, with small amounts of arsenic and phosphorus was treated in the same manner. Analysis of the final ore showed practically no sulfur or phosphorus, while the content of metallic impurities was as follows:

|  | Per cent |
|---|---|
| Cobalt | 0.08 |
| Copper | 0.02 |
| Nickel | 0.11 |

The leach liquor showed but a trace of iron. The residual ore was in good condition for concentrating out the silica.

These examples show that impure iron ores can be readily beneficiated by the process provided by the invention, so that they are suitable for the manufacture of pure iron. The metalloids are removed substantially completely, and metallic impurities may be removed to an extent such that they are not objectionable.

As an example of the benefits to be had from the use of pressure during the chloridizing roast of this invention, there may be cited a charge of refractory ore containing 3.63 per cent of nickel, 0.33 per cent of cobalt, 0.26 per cent of copper, and 25 per cent of sulfur, which had been subjected to a preliminary roast that was too rapid and too hot. After this unsatisfactory preliminary roast, the ore was ground to 200-mesh and divided into two portions. The first portion was made quasi-wet with sodium chloride solution and then treated during ten hours in a rotary muffle according to the above described preferred countercurrent procedure, with chlorine and heat from 100° C. at first to 450° C. at the end. Three per cent sodium chloride was used. Subsequent leaching gave an extraction of 62% of the nickel, and similarly for the cobalt and copper.

The second portion was treated in the same way except that twice during the chloridizing roast it was subjected to forty or forty-five pounds air pressure for about twenty minutes. The subsequent water extraction of nickel was 97%, and similarly for cobalt and copper. The first heating period was at a temperature of 200° C. and the second at 350° C.

Further illustration may be had by reference to the chloridizing of tailings obtained from leaching a roasted zinc ore with 5 per cent $H_2SO_4$. These tailings were treated with sulfur dioxide and chlorine with the ore quasi-wet. Sodium chloride was then added and chloridizing carried out in a rotary furnace during eight hours with the temperature regulation and countercurrent atmosphere characteristic of this invention. One portion was treated thus without pressure, and another portion was subjected every two hours during the roast to about forty pounds air pressure for twenty minutes. These charges were leached first with water, then with dilute sodium hydroxide solution to remove lead, and finally with ammonium hydroxide to remove silver chloride. The analyses were:

| Ore | Roasted material | |
|---|---|---|
|  | No-pressure | Pressure |
|  | Per cent | Per cent |
| Copper 0.35% | 57 | 89 |
| Lead 9.86% | 97 | 98 |
| Zinc 3.25% | 99 | 98 |
| Silver 79.6 oz | 70 | 98 |

It is apparent in practice that an outstanding merit of conducting chloridizing roasts in accordance with the principles of this invention is that relatively simple leaching operations become possible to obtain highly efficient extractions, even from low grade or from refractory material.

It will be recognized by those skilled in this art that other halides than sodium chloride may be utilized; for example, such as heretofore have been employed in chloridizing processes. These are intended to be comprehended in the significance of the term sodium chloride in the description and claims of this specification. Also, though chlorine is the usual economical and preferred halide, it will be apparent to those skilled in this art that other halogens also would be operative.

According to the provisions of the patent statutes, I have explained the principle and mode of operation of my invention, and have described what I now consider to represent its best embodiment. However, I desire to have it understood that, within the scope of the appended claims, the invention may be practiced in other ways than as specifically described.

I claim:

1. The process of solubilizing metal values in ore, comprising bringing a finely-divided mixture of ore and a reagent metal in the form of -ous oxide to quasi-wet condition and treating it with an acidic reagent gas to react with and form soluble compounds of the metal values, while agitating the mixture and maintaining it in quasi-wet condition during the treatment.

2. The process of solubilizing metal values in oxidized ore, comprising bringing a finely-divided mixture of said ore and ferrous oxide to quasi-wet condition, and treating it with gaseous chlorine to chloridize the oxidized values while maintaining ferrous oxide therein.

3. The process of solubilizing metal values in oxidized ore, comprising treating a finely-divided quasi-wet mixture of said ore and ferrous oxide with chlorine to effect partial attack of the ore, and then heating the ore in admixture with chloridizing salt up to about 550° C. and during the heating agitating the mixture, maintaining ferrous oxide therein, and treating with chlorine and sulfur oxide gases to obtain a loose, chloridized ore product for ready extraction of metal values.

4. The process of solubilizing metal values in oxidized ore, comprising preparing a finely divided quasi-wet mixture of said ore and ferrous oxide, agitating and treating the mixture while quasi-wet with gaseous chlorine to effect partial chloridizing, and then subjecting the thus-treated material in admixture with chloridizing salt to progressive increase in temperature up to about 550° C. while treating it with restricted amounts of sulfur oxide and passing at atmosphere of gaseous chlorine in contact therewith from regions of higher to lower temperature.

5. A process of preparing ore for extraction of its metal values, comprising subjecting a finely-divided quasi-wet mixture of ore, ferrous oxide and a ferrous salt having an acid constituent capable of reacting with the metal values to form soluble compounds thereof, to progressive increase in temperature up to about 550° C. for gradual decomposition of said ferrous salt, while agitating the ore and treating it with an atmosphere containing said acid constituent in an amount greater than that resulting from said ferrous salt decomposition and with amounts of oxygen restricted to retain an amount of ferrous oxide throughout the heating.

6. A process of chloridizing metal values in ore, comprising heating a finely-divided quasi-wet mixture of ore, ferrous oxide and ferrous chloride gradually between 100° and 400° C. to decompose the ferrous chloride progressively and chloridize the values, while maintaining in contact with the mixture an atmosphere containing oxygen in amounts limited to retain ferrous oxide, and containing free chlorine in amount greater than that resulting from said ferrous chloride decomposition.

7. A process of chloridizing metal values comprising heating and agitating a mixture of said values and ferrous chloride in finely divided and quasi-wet condition progressively to about 400° C. to decompose the ferrous chloride gradually and chloridize said values, and maintaining in contact with the mixture during said decomposition ferrous oxide and an atmosphere containing oxygen and free chlorine in an amount greater than that resulting from said ferrous chloride decomposition, and during said decomposition imposing pressure above atmospheric, and completing chloridizing with a halide salt in the presence of a sulfate constituent and with elevation of temperature to approximately 500° C.

8. A process of preparing oxidized ore for extraction of its metal values, comprising subjecting a finely-divided quasi-wet mixture of such ore, ferrous oxide and ferrous chloride to progressive increase of temperature to about 300° C. for initial chloridizing attack of the ore, and then in admixture with sodium chloride to about 550° C. for further attack of refractory values, while agitating and treating the ore at the higher temperatures with an atmosphere containing sulfur dioxide, oxygen in amounts limited to retain ferrous oxide, and free chlorine, and passing the resultant atmosphere from regions of high temperature to the ore in quasi-wet condition.

9. The process of preparing oxidized ore for extraction of its metal values, comprising passing finely-divided quasi-wet ore containing reagent metal in the form of an -ous oxide through a furnace and agitating it during its travel therethrough, gradually heating the quasi-wet agitated ore to between 250° and 550° C. and contacting it with an acidic reagent gas, maintaining moisture condensing conditions in the ore adjacent its inlet and prior to its heating, and causing steam and acidic reagent gases evolved from the heated ore to flow in contact with the ore from regions of higher to regions of lower temperature, to quasi-wet the incoming ore and absorb the reagent gases therein.

10. A process of chloridizing ores comprising agitating and passing a quasi-wet charge of said ore containing ferrous chloride progressively through a furnace in an atmosphere containing chlorine and oxygen during a gradual increase of temperature to about 400° C. to cause partial chloridizing of the ore, while maintaining ferrous oxide in the ore during this period, and then completing chloridizing and evolving chlorine by decomposition of another halide in the ore with restricted amounts of a sulfate constituent during elevation of temperature to about 500° C., maintaining moisture condensing conditions in the ore adjacent the ore inlet and causing said evolved chlorine to flow in contact with the ore from the regions of maximum temperature to said moist ore.

11. A process of chloridizing oxidized ores comprising providing a quasi-wet charge of said ores and ferrous chloride, agitating and progressing said charge through a furnace in an atmosphere containing chlorine and oxygen during a gradual increase of temperature to about 400° C. to cause partial chloridizing of the ore while maintaining ferrous oxide in the ore during this period and then completing chloridizing and evolving chlorine by decomposition of another halide in the ore with restricted amounts of a sulfate constituent during elevation of temperature to about 500° C., maintaining a moisture condensation zone in the ore adjacent the ore inlet and causing said evolved chlorine to flow in contact with the ore from the regions of maximum temperature to said moist ore.

12. A process of solubilizing metal values of oxidized ores comprising passing a quasi-wet charge of said ores and ferrous chloride in a furnace into and through a zone of gradually increasing temperature to about 400° C. to cause partial chloridizing of the values, while agitating the mixture in contact with an atmosphere containing chlorine and oxygen and maintaining ferrous oxide in the ore during this period, and then completing chloridizing and evolving chlorine by decomposition of another halide in the ore during intermittent introduction of restricted amounts of sulfur dioxide into this halide decomposition zone and during elevation of temperature to about 500° C., maintaining moisture condensing conditions in the ore adjacent the ore inlet and causing said evolved chlorine to flow in contact with the ore from regions of maximum temperature into said moist ore, and lowering the temperature of the discharging ore with restriction of oxygen to control retention of the values as chlorides.

13. A process of chloridizing oxidized ores comprising providing a quasi-wet charge of said ores and ferrous chloride, agitating and progressing said charge through a furnace in an atmosphere containing chlorine and oxygen during a gradual increase of temperature to above about 400° C. to cause partial chloridizing of the ore while maintaining ferrous oxide in the ore during this period, and then completing chloridizing and evolving chlorine by decomposition of another halide in the ore during intermittent introduction of restricted amounts of sulfate constituent into this halide decomposition zone and during elevation of atmosphere to about 500° C., maintaining a moisture condensation zone in the ore adjacent the ore inlet and causing said evolved chlorine to flow in contact with the ore from regions of maximum temperature into said moist ore, and imposing pressure on the gaseous atmosphere of approximately one to fifty pounds above atmospheric.

14. A process of chloridizing oxidized ores comprising providing a quasi-wet charge of said ores and ferrous chloride, agitating and progressing said charge through a furnace in an atmosphere containing chlorine and oxygen during a gradual increase of temperature to about 400° C. to cause partial chloridizing of the metal values while maintaining ferrous oxide in the ore during this period, and then completing chloridizing and evolving chlorine by decomposition of another halide in the ore with intermittent introduction of restricted amounts of sulfate constituent into this halide decomposition zone with elevation of atmosphere to about 500° C., maintaining a moisture condensation zone in the ore adjacent the ore inlet and causing said evolved chlorine to flow in contact with the ore from regions of maximum temperature into said moist ore, and introducing a current of gas of low oxygen content to cool the discharge ore and to control retention of the values as chlorides and then to flow over substantially the entire charge.

15. A process of chloridizing oxidized ores containing iron, comprising consecutively subjecting such ores to reducing conditions to form ferrous oxide distributed therein, bringing such ore to finely divided condition and then to quasi-wet condition, and then treating the ore with nascent chlorine while gradually heating from atmospheric temperature up to about 500° C., and maintaining ferrous oxide in the ore during such treatment.

16. A process of treating sulfide ore for extraction of its metal values, comprising oxidizing the ore, then preparing a finely-divided quasi-wet mixture of the ore, ferrous oxide and a halide, then subjecting the mixture progressively to gradually increasing temperature to approximately 550° C. and during heating agitating the ore and maintaining in contact therewith a counterflow of gaseous chlorine containing oxygen and sulfur dioxide from regions of higher temperature to the quasi-wet ore, and then cooling the ore, oxygen being restricted throughout to retain ferrous oxide until the ore is cooled.

17. The process of treating oxidized ores comprising reducing them substantially to minus one hundred forty standard mesh, providing ferrous iron therein, and subjecting a charge thereof to agitation and a current of gas from which moisture and reagent gases are introduced into the charge and thereafter elevating the temperature progressively to expel moisture and reagent gas from portions thereof, and re-introducing these evolved vapors into fresh charges to constitute a cycle.

In testimony whereof, I sign my name.

RALPH F. MEYER.